UNITED STATES PATENT OFFICE.

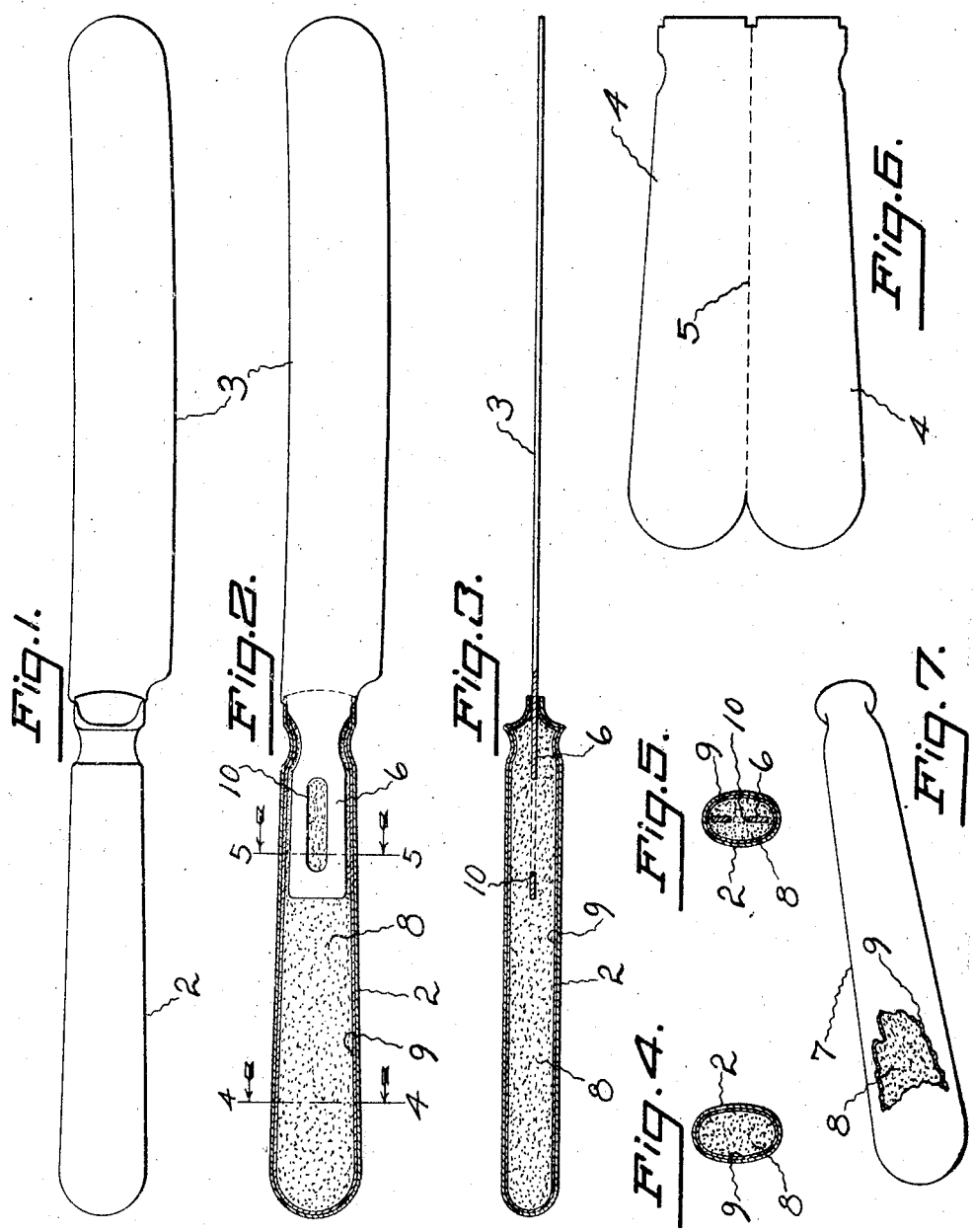

HUBERT C. HART, OF UNIONVILLE, CONNECTICUT.

ARTICLE OF CUTLERY.

1,332,254.                    Specification of Letters Patent.         Patented Mar. 2, 1920.

Application filed April 17, 1919.   Serial No. 290,806.

*To all whom it may concern:*

Be it known that I, HUBERT C. HART, a citizen of the United States, residing at Unionville, in the county of Hartford and State of Connecticut, have invented certain new and useful Improvements in Articles of Cutlery, of which the following is a specification.

This invention relates to what I shall for convenience term an "article of cutlery." As will be evident, the invention is susceptible of general use. In other words, the invention may be incorporated in such things as knives, forks, spoons and their equivalents, which are of course illustrative. The primary object of the invention is the provision in a device of the character to which I have referred and which has a handle or analogous manipulating portion of hollow kind, of exceedingly simple means for effectually excluding the entrance of water into the handle, the means being capable of ready and inexpensive production and easy introduction into the handle.

In the drawings accompanying and forming part of the present specification I have shown somewhat fully, one of the several advantageous forms of embodiment of the invention which will be set forth fully in the following description to enable those skilled in the art to practise the invention. Obviously I am not limited to this showing; I may depart therefrom in several particulars within the scope of the invention defined by the claim following said description.

Referring to said drawings:

Figure 1 is a side elevation of a knife embodying the invention.

Fig. 2 is a sectional elevation of the same, the section being taken depthwise longitudinally through the handle and the blade being in elevation.

Fig. 3 is a practically similar view, the section of the handle, however, being at right angles to that of the preceding view.

Figs. 4 and 5 are transverse sections on the lines 4—4 and 5—5 respectively of Fig. 2 looking in the direction of the arrows.

Fig. 6 is an elevation of the handle in blank form.

Fig. 7 is a perspective view of the handle with a part broken out to illustrate the interior.

Like characters refer to like parts throughout the several views.

The invention generally speaking, is along the same lines as that covered more broadly in Letters Patent No. 1,161,665 granted to me November 23, 1915, and to which reference may be had. I should make it clear that present invention can be incorporated in handles of many different kinds of implements, several of which I have specifically identified. It will be understood that there are knives and like implements, comprising a hollow handle and a blade associated with the handle, the tang or shank of the blade being usually fitted into the handle. It is a fact as I observe in said prior patent, that when these knives or similar tools are put into dish water, the water passes into the handle, especially around the opening between the tang or shank of the blade and the handle. As I also note in said patent, this water ordinarily remains in the handle and passes therefrom at inopportune times, such as in the case of a knife when the user is eating a meal, the result in this event, being especially disagreeable. In said patent as in the present case, I provide means by which the entrance of water into the handle during dish washing, is positively prevented. The invention of said patent is of highly important character as I have demonstrated after long experience. Really I secure all the many advantages attained by the structure of said patent, but what is of vital importance I do so in a less expensive manner, by means which of course possess all the advantages of those disclosed by the patent.

Referring to the drawings, the numeral 2 denotes a handle and 3 a blade both of which are of suitable nature. The term "blade" of course, is employed in a generic sense to include not only a knife-blade, but an analogous part such as is found in a fork or spoon which are merely two of several forms of blades. The handle 2 is made from a blank such as that illustrated in developed form in Fig. 6. The handle 2 comprises duplicate portions or sides 4 foldable along the longitudinally extending line 5. The portions or sides 4 are longitudinally grooved or channeled as in the patent, so that when their free edges are brought into abutment the hollow handle will be produced, its rear end being closed and its forward open. The front opening is intended to receive the tang or shank 6 of the blade, said tang or shank being gripped closely or tightly by and between the portions or sides of the handle. I might state now as I did in the patent that the handle and blade construction as thus far described somewhat in detail is quite old but with it may be associated the features of my invention.

The hollow handle wholly incloses a filling such as that denoted in a general way by 7, this filling being of compressible material, so that when the handle blank is closed upon the filling the latter is further densified in view of which circumstance the filling is properly held against movement and yet may exercise its function of excluding the entrance of water into the handle.

The filling 7, which is coextensive with the joint between the side portions of the handle, is of composite character comprising a core or body-piece 8 and a coating 9. This core or body-piece 8 is of paper stock, usually waste material but which I can utilize with extreme advantage. There are many kinds of paper stock which I can employ as will be understood. The coating not only preferably waterproofs it in an effectual manner but serves to protect it as I have found. The coating may be of any desirable character.

As will be apparent the coating or covering for the suitably-molded core or body-piece may vary. I have found a solution comprising paraffin in its make-up, as highly satisfactory. In such a solution I would employ for instance one pint of paraffin to a larger proportion of a fluid, such as benzin or alcohol, the former being comparatively-speaking, somewhat inexpensive, more so in fact than the alcohol. The thinning liquid when a pint of paraffin is used, would be approximately one gallon. The mixture is applied to the core in some convenient manner as dipping the latter into the former.

The front or forward end of the filling 7 is slit or kerfed, the slit receiving the tang or shank 6 of the blade and when the tang is slipped into the kerf or slit the stock of the filling is compressed into the longitudinal slot 10 in the tang so as to anchor or firmly unite together the two parts. When they are assembled the filling with the tang connected therewith is placed within one of the portions of the handle blank and the latter then closed on the filling which compresses the filling cross-sectionally less than its original extent.

What I claim is:

A hollow handle comprising longitudinally-abutting side portions and a compressible filling comprising paper stock in the handle, the filling being coextensive with the joint between said side portions and being initially of greater cross sectional extent than the cross sectional extent of the interior of the handle, said portions when abutting acting compressively against the filling and the latter preventing entrance of water into a blade, the front end portion of the handle having an opening the blade being furnished with a tang which extends through said opening and has a slot into which said filling is compressed, the filling closing the front end opening of the handle and said filling and said tang constituting the only means inclosed by the handle.

In testimony whereof I affix my signature in the presence of two witnesses.

HUBERT C. HART.

Witnesses:
   MARGARET T. DENNIS,
   HEATH SUTHERLAND.